(12) United States Patent
Berme

(10) Patent No.: US 8,181,541 B2
(45) Date of Patent: May 22, 2012

(54) LOW PROFILE TRANSDUCER WITH HIGH MOMENT CAPACITY

(75) Inventor: Necip Berme, Worthington, OH (US)

(73) Assignee: Bertec Corporation, Columbus, OH (US)

( * ) Notice: Subject to any disclaimer, the term of this patent is extended or adjusted under 35 U.S.C. 154(b) by 217 days.

(21) Appl. No.: 12/780,441

(22) Filed: May 14, 2010

(65) Prior Publication Data

US 2011/0277562 A1   Nov. 17, 2011

(51) Int. Cl.
*G01L 1/04* (2006.01)

(52) U.S. Cl. .................................. 73/862.639

(58) Field of Classification Search ............. 73/862.634, 73/862.639

See application file for complete search history.

(56) References Cited

U.S. PATENT DOCUMENTS

| | | | |
|---|---|---|---|
| 4,924,708 A * | 5/1990 | Solomon et al. ................ 73/799 |
| 4,993,506 A * | 2/1991 | Angel ............................ 177/211 |
| 5,166,571 A * | 11/1992 | Konno et al. ................. 310/333 |
| 5,510,581 A * | 4/1996 | Angel ............................ 177/211 |
| 5,814,740 A | 9/1998 | Cook et al. |
| 5,889,208 A * | 3/1999 | Nose ......................... 73/504.16 |
| 5,889,214 A | 3/1999 | Kang et al. |
| 5,929,391 A * | 7/1999 | Petrucelli et al. ............. 177/211 |
| 6,354,155 B1 | 3/2002 | Berme |
| 7,204,010 B2 * | 4/2007 | Germanton ..................... 29/595 |
| 2010/0031746 A1 * | 2/2010 | Paros et al. ................. 73/382 G |

* cited by examiner

*Primary Examiner* — Max Noori
(74) *Attorney, Agent, or Firm* — The Law Office of Patrick F. O'Reilly, III, LLC

(57) ABSTRACT

A load transducer for use in an automated control system such as those used in robotic assemblies, and other linkage systems separated by joints. The transducer is capable of measuring force and moments transmitted by the joint of the robotic assembly. This localized sensory data is utilized by a microprocessor to control the motion of the linkages of the system. In addition to being very accurate and reliable, the load transducer has a low profile and small size. This invention is easily manufactured using strain gage technology.

20 Claims, 4 Drawing Sheets

US 8,181,541 B2

LOW PROFILE TRANSDUCER WITH HIGH MOMENT CAPACITY

CROSS-REFERENCE TO RELATED APPLICATIONS

Not Applicable

STATEMENT REGARDING FEDERALLY SPONSORED RESEARCH

Not Applicable

REFERENCE TO APPENDIX

Not Applicable

FIELD OF THE INVENTION

The field of the invention relates to single and multi-component load transducers utilizing multiple strain gage load cells for precise measurement of forces and moments and, more particularly, to beam-style load cells requiring an overall small size, high capacity, and yet high sensitivity.

BACKGROUND OF THE INVENTION

The use of strain gages in load transducers to measure forces and moments is a known art. A transducer can incorporate one or more load channels. Each load channel measures one of the load components, and is comprised of one or more strain gages mounted to one or more elastic elements that deform under the applied load. An appropriate circuitry relates the resistance change in each set of gages to the applied force or moment. Strain gages have many industrial, medical, and electrical applications due to their small size, low production cost, flexibility in installation and use, and high precision.

A typical low profile, small, multi-component load transducer only functions correctly when the axial (i.e. vertical) force acts relatively central to the transducer. Specifications of such transducers indicate a maximum allowable offset for the force being approximately half the diameter of the transducer. Technical specifications of transducers are given as the allowable force and moment ratings, where the moment rating is obtained by multiplying the maximum allowable force with the maximum allowable offset of the force.

Transducers can be used to measure forces and moments in linkages such as those found in a robotic arm, where the links are connected by joints, and the magnitude and offset of the forces transmitted by these joints are used to control the linkage. In such applications, it is desirable to have a transducer which has significantly higher moment capacity then those available in the market. Accordingly, there is a need for an improved low profile load transducer with high moment capacity.

SUMMARY OF THE INVENTION

Disclosed are load transducers which address one or more issues of the related art. Disclosed is a load transducer comprising, in combination, a one-piece frame having a base and a plurality of beams extending from the base, and at least three load cells located near ends of the beams and capable of measuring a force and its position.

Also disclosed is a load transducer comprising, in combination, a frame having a base and a pair of double-cantilevered beams at lateral sides of the base, and load cells located near ends of the beams and capable of measuring a force and its position.

Also disclosed is a load transducer comprising, in combination, a compact frame having a base and a plurality of beams extending from the base, and at least three load cells located near ends of the beams and capable of measuring a force and its position.

From the foregoing disclosure and the following more detailed description of various preferred embodiments it will be apparent to those skilled in the art that the present invention provides a significant advance in the technology and art of load transducers. Particularly significant in this regard is the potential the invention affords for providing a low profile load transducer with high moment capacity. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
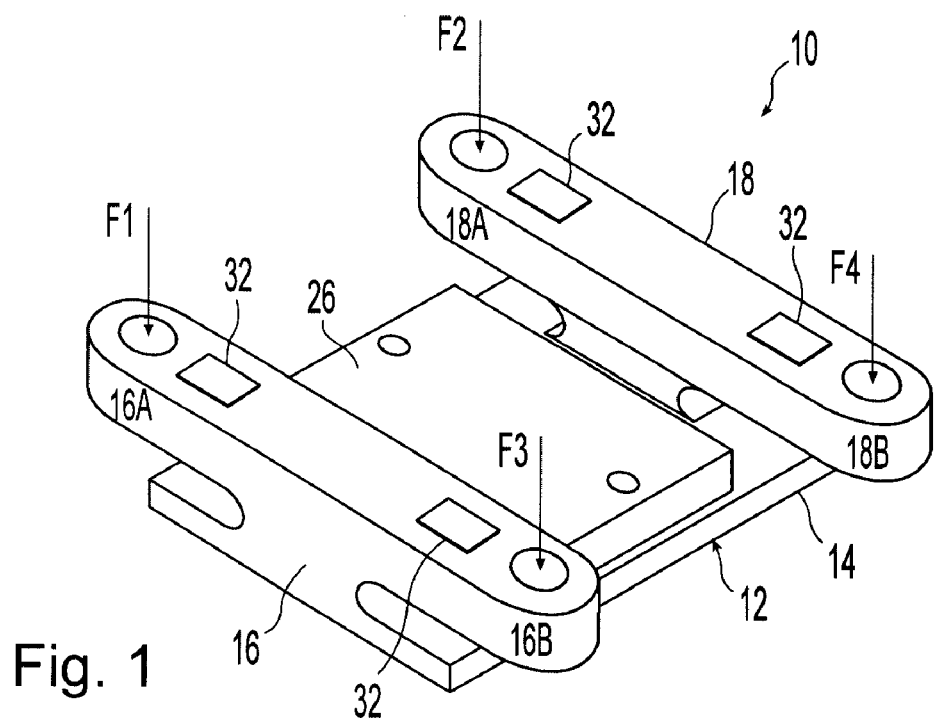
FIG. 1 is a simplified perspective view of a load transducer according to the present invention.

It should be understood that the appended drawings are not necessarily to scale, presenting a somewhat simplified representation of various preferred features illustrative of the basic principles of the invention. The specific design features of the load transducers as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the load transducers illustrated in the drawings. In general, up or upward generally refers to an upward direction within the plane of the paper in FIG. 1 and down or downward generally refers to a downward direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved load transducers disclosed herein. The following detailed discussion of various alternative and preferred embodiments will illustrate the general principles of the invention. Other embodiments suitable for other applications will be apparent to those skilled in the art given the benefit of this disclosure.

Referring now to the drawings, FIG. 1 illustrates a load transducer 10 according to the present invention. This load transducer 10 is designed to have a low profile, small size, trivial weight, high sensitivity, and easy manufacturability. The load transducer 10 includes a one-piece compact transducer frame 12 having a base 14 and a plurality of beams 16, 18 extending from the base 14, and at least three load cells 16A, 16B, 18A, 18B formed at ends of the beams 16, 18 and capable of measuring a force F1, F2, F3, F4 and its position. The illustrated load transducer 10 comprises four single-axis load cells 16A, 16B, 18A, 18B on a common structure or frame 14. It is noted, however, that three load cells are sufficient to calculate the force and the two moments relative to the structure it is mounted to.

The illustrated transducer frame 12 is shown in FIGS. 2 to 5. The illustrated transducer frame 12 includes the base 14 and the pair of parallel and spaced apart beams 16, 18. The illustrated transducer frame 12 is milled as one solid and continuous piece of a single material. That is, the transducer frame 12 is of unitary or one-piece construction with the base 14 and the beams 16, 18 integrally formed together. The transducer frame 12 is preferably machined in one piece from aluminum, titanium, steel, or any other suitable material that meets strength and weight requirements. Alternatively, the beams 16, 18 can be formed separately and attached to the base 14 in any suitable manner.

The illustrated base 14 is a rectangular-shaped plate having planar upper and lower surfaces. It is noted, however, that the base 14 can alternatively have any other suitable shape. The illustrated base 14 has a central opening 20 formed therein to reduce weight but maintain strength of the transducer frame 12 as a whole. It is noted that this opening 20 can be of any suitable size and shape and also can alternatively be eliminated if desired. The illustrated base 14 also has vertically-extending, threaded openings 22 located near corners for attachment of a first mounting plate or bracket used to secure the load transducer 10 to another structure. It is noted that any other suitable means for attachment of the first mounting plate can alternatively be utilized. The illustrated base 14 further has a pair of vertically-extending openings 24 located at lateral sides of the central opening 20 and between the beams 16, 18 for attachment of electronics or circuitry 26 as described in more detail hereinafter. It is noted that any other suitable means for attachment of the electronics 26 can alternatively be utilized.

The illustrated beams 16, 18 are located at the upper side of the base 14 and horizontally extend in a forward-rearward direction at lateral side edges of the base 14. The illustrated beams 16, 18 extend substantially parallel to the top of the base 14. The illustrated beams 16, 18 each have a pair of cantilevered ends that extend beyond the forward and rearward edges of the base 14 to allow for deflection of the ends of the beams 16, 18 in the vertical direction. It is noted that while the illustrated embodiment includes a pair of double cantilevered beams 16, 18, a plurality of single cantilevered beams can alternatively be utilized (see FIG. 9). The illustrated beams 16, 18 are substantially parallel and laterally spaced apart. It is noted, however, that the beams 16, 18 can alternatively be non-parallel. The illustrated beams 16, 18 are provided with vertically extending openings 28 near their ends for fasteners to attach a second mounting plate or bracket used to secure the load transducer 10 to another structure. It is noted that any other suitable means for attachment of the second mounting plate can alternatively be utilized.

The illustrated beams 16, 18 have a rectangular-shaped cross section to form generally planar upper and lower surfaces for attachment of load cell components as described hereinafter. The illustrated upper planar surfaces are recessed below the upper end surfaces at the openings 28 to protect the load cell components from engagement with the second mounting bracket. The illustrated beams 16, 18 also have horizontal and laterally-extending openings 30 therethrough near the attachment areas for the load cell components for increasing the deflectability of the beams 16, 18 as desired. It is noted that these openings 30 can be of any suitable size and shape as needed and also be eliminated if desired. It is also noted that the illustrated beams 16, 18 also form generally planar lateral left and right side surfaces for alternative attachment of the load cell components as described hereinafter. It is further noted that the beams 16, 18 can alternatively have other cross-sectional shapes depending on whether it is desired to have planar surfaces at the top and/or bottom or left and/or right sides for the load cell components but the illustrated rectangular shape is particularly desirable because the same frame 12 can be used for multiple configurations of the load cells 16A, 16B, 18A, 18B.

The illustrated one-piece frame 12 has a low profile or is compact. The terms "low profile" and "compact" are used in this specification and the claims to mean that the height is substantially smaller than the diameter or footprint so that the load transducer 10 can be utilized in a mechanical joint without significant changes to the mechanical joint. The illustrated one-piece frame has a height H that is about 25% its diameter D. As a result, the load transducer 10 has a low profile or is compact and has a height H that is about 25% its diameter D.

As best shown in FIG. 1, the illustrated load cells 16A, 16B, 18A, 18B are located near the ends of the beams 16, 18. In a preferred embodiment, the load cells 16A, 16B, 18A, 18B comprise a plurality of strain gages 32. In other preferred embodiments alternate load and/or moment sensors may be utilized as required or desired as long as they do not interfere with the advantages of the design as a whole. For example, piezoelectric gages or Hall-effect sensors are possible alternatives to the strain gages 32.

Figure 6:
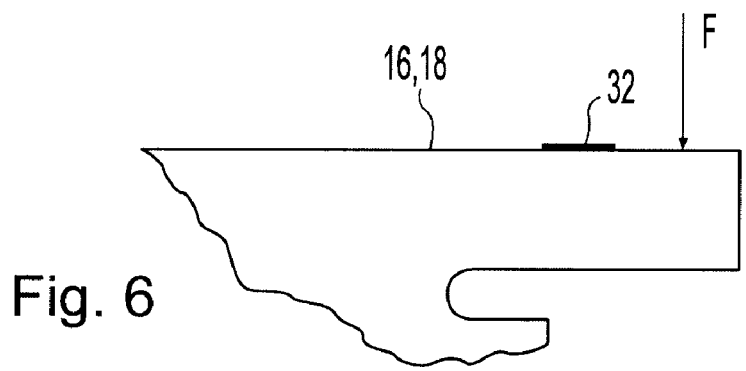
FIG. 6 is an enlarged, fragmented side elevational view of a portion of the load transducer of FIG. 1 which is configured with bending beam load cells

As best shown in FIG. 6, the illustrated load cells 16A, 16B, 18A, 18B are configured as bending beam load cells. The illustrated strain gages 32 are mounted to the upper surfaces of the beams 16, 18 near the ends of the beams 16, 18. Alternatively, the strain gages 32 can be mounted to the lower surfaces of the beams 16, 18 near the ends of the beams 16, 18. That is, the strain gages 32 are mounted to surfaces generally normal to the direction of force F1, F2, F3, F4 applied to the end of the beams 16, 18. It is also noted that alternatively, the strain gages 32 can be mounted at both the upper surface and the lower surface of the beams 16, 18. These strain gages 32 measure force either by bending moment or difference of bending moments at two cross sections. As force is applied to the ends of the beams 16, 18, the beams 16, 18 bend. This bending either stretches or compresses the strain gage 32, in turn changing the resistance of the electrical current. The amount of change in the electrical voltage or current is proportional to the magnitude of the applied force F1, F2, F3, F4.

Figure 7:
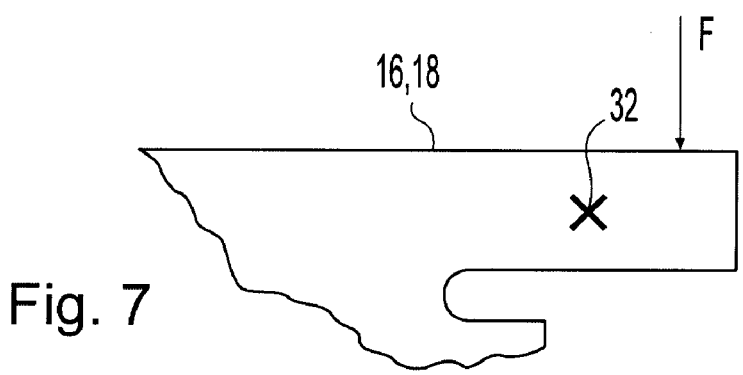
FIG. 7 is an enlarged, fragmented, side elevational view similar to FIG. 6, but configured with shear-web load cells.
Figure 2:
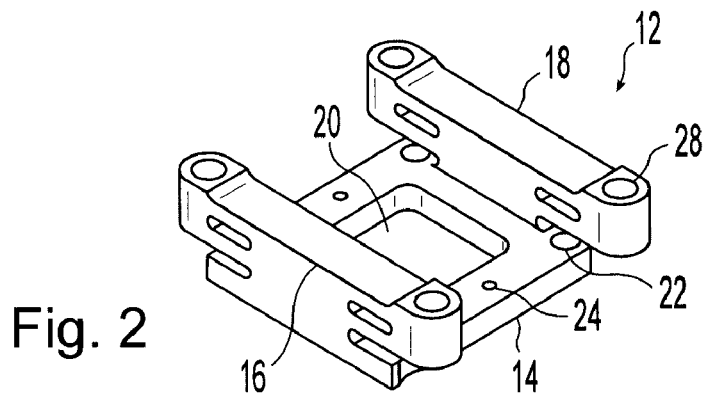
FIG. 2 is a perspective view of a transducer frame of the load transducer of FIG. 1.
Figure 3:
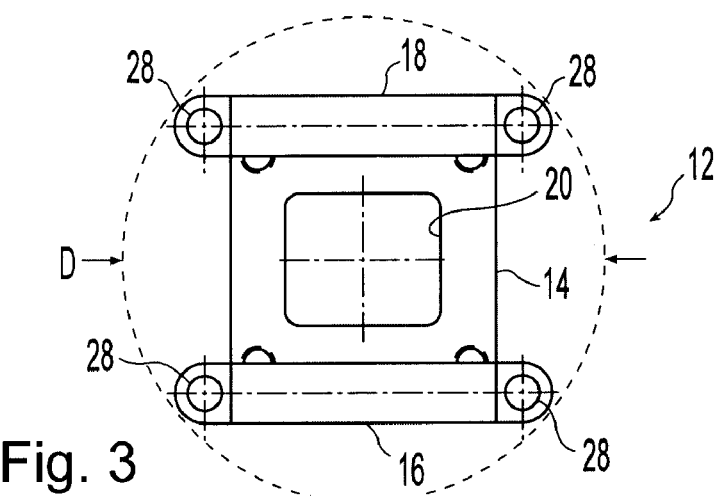
FIG. 3 is a top plan view of the transducer frame of FIG. 2.
Figure 4:
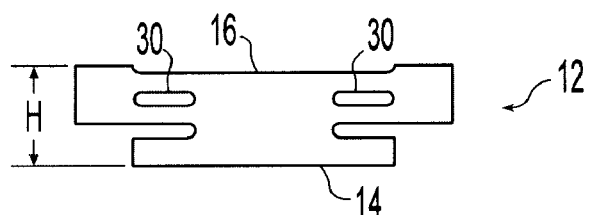
FIG. 4 is side elevational view of the transducer frame of FIGS. 2 and 3.
Figure 5:
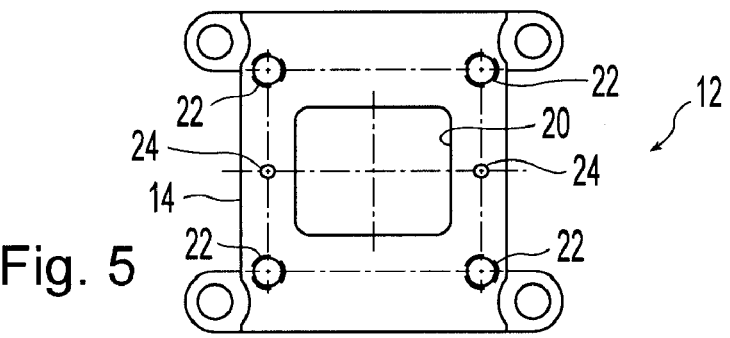
FIG. 5 is a bottom plan view similar of the transducer frame of FIGS. 2 to 4.

As best shown in FIG. 7, the load cells 16A, 16B, 18A, 18B can alternatively be configured as shear-web load cells. In this configuration, the strain gages 32 are mounted to either one of the lateral side surfaces of the beam 16, 18 near the end of the beam 16, 18. It is noted that alternatively, the strain gages 32 can be mounted at both of the lateral side surfaces of the beams 16, 18. Mounted in these positions, the strain gages 32 directly measure shear as force is applied to the end of the beam 16, 18.

As best shown in FIG. 1, the load transducer 10 measures applied force F1, F2, F3, F4 at each of the load cells 16A, 16B, 18A, 18B. The sum of the forces is the force being applied to any assembly attached to the top of the load transducer 10. The load cells 16A, 16B of the first beam 16 measure the force being applied to one lateral side of the load transducer 10; whereas, load cells 18A, 18B of the second beam 18 measure the force being applied to the other lateral side of the load transducer 10. The various moments are determined by subtracting the sum total of the forces acting on one pair of load cells from the sum total acting upon the opposite pair—for example, subtracting the sum total of the forces acting on load cell 16B and load cell 18B from the sum total of the forces acting on load cell 16A and load cell 18A, subtracting the sum total of load cells 18A and load cell 18B from the sum total of load cells load cell 16A and load cell 16B.

Figure 8:
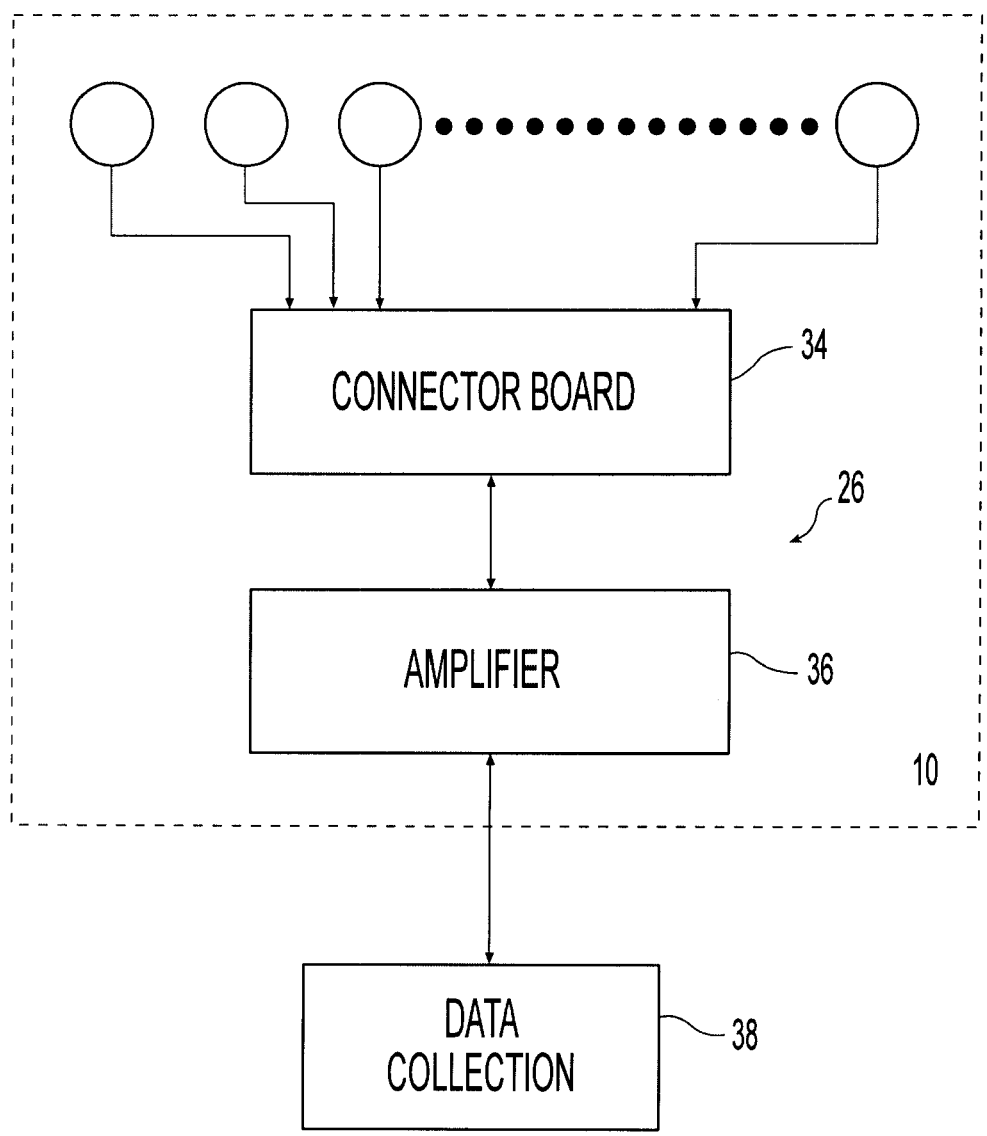
FIG. 8 is a block diagram of electrical connections for the load transducer of FIG. 1.

The sensory information from the strain gages 32 is transmitted to a microprocessor which could then be used to control the assembly to which the load transducer is a part of, such as a robotic assembly. As best shown in FIG. 1, the transducer frame 12 provides an area where associated electronics and/or circuitry 26 is mounted. Alternatively, the electronics 26 can be mounted at any other suitable location. FIG. 8 schematically illustrates the electronics or circuitry 26. The strain gages 32 are connected to a connector board 34 which in turn is electrically connected to an amplifier 36. The amplifier is connected either by wire or wirelessly to the data collection device or microprocessor 38 which is used to control the assembly.

Figure 9:
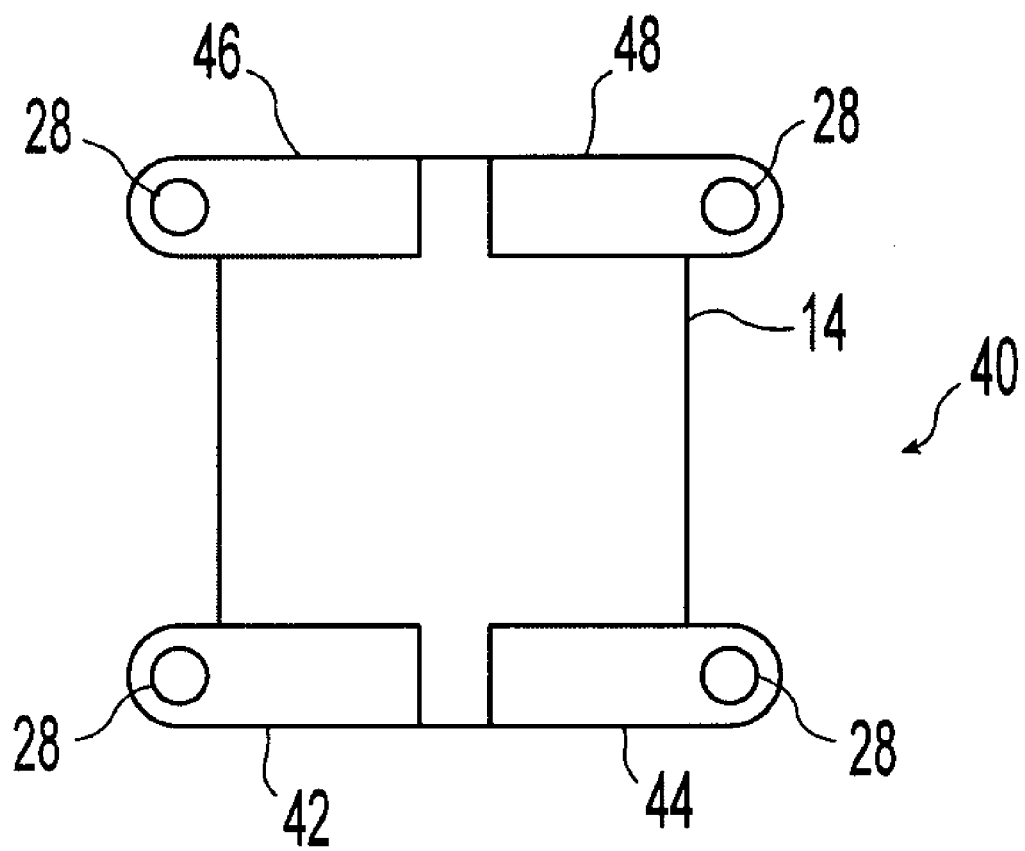
FIG. 9 is a top plan view of an alternative transducer base frame according to the present invention.

FIG. 9 illustrates an alternative embodiment of the transducer frame 40 according to the present invention. The alternative transducer frame 40 illustrates that the double-cantilevered beams 16, 18 can be replaced with single cantilevered beams 42, 44, 46, 48.

Any of the features or attributes of the above described embodiments and variations can be used in combination with any of the other features and attributes of the above described embodiments and variations as desired.

It is apparent from the above detailed description that the present invention provides a low profile three-component load transducer 10, which has a significant allowable offset for the line of action of the force. In that, for a given allowable maximum load, this load transducer has a much higher moment capacity than currently available load transducers and the offset value can be as high as five times the diameter of the transducer. Therefore, the load transducer 10 according to the present invention is able to withstand and measure moments which are approximately ten times higher than that of a similarly sized and rated conventional load cell.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A load transducer comprising, in combination:
    a frame having a base with an upper surface and a plurality of beams extending from the base, each of the plurality of beams including a lower surface that is spaced apart from, and faces in an opposing relationship, the upper surface of the base, each of the plurality of beams further including at least one cantilevered end; and
    at least three load cells, each of the at least three load cells being located near a respective one of the cantilevered ends of the beams, the at least three load cells configured to measure a force and its position.

2. The load transducer according to claim 1, wherein each of the at least three load cells comprises a strain gage configured to measure a load component applied at a respective one of the cantilevered ends of the beams.

3. The load transducer according to claim 2, wherein the frame is compact and of one-piece construction.

4. The load transducer according to claim 1, wherein each of the at least three load cells is configured as a bending beam load cell.

5. The load transducer according to claim 1, wherein each of the at least three load cells is configured as a shear-web load cell.

6. The load transducer according to claim 1, wherein the at least three load cells comprise four load cells, each of the four load cells being located near a respective one of the cantilevered ends of the plurality of beams so that it is capable of measuring a load component applied thereto.

7. The load transducer according to claim 1, wherein the plurality of beams comprises a pair of double-cantilevered beams, each of the double-cantilevered beams including a first beam section extending in a first direction and a second beam section extending in a second direction that is opposite to the first direction, and wherein the cantilevered ends of each of the plurality of beams are oppositely disposed with respect to one another.

8. The load transducer according to claim 7, wherein the double-cantilevered beams are laterally spaced apart from one another, and wherein the first direction in which each of the first beam sections extends is substantially parallel to the second direction in which each of the second beam sections extends.

9. The load transducer according to claim 7, wherein electronics for the at least three load cells are mounted on the base and between opposed lateral sides of the pair of double-cantilevered beams.

10. A load transducer comprising, in combination:
    a frame having a base with an upper surface and a pair of double-cantilevered beams disposed at lateral sides of the base, each of the double-cantilevered beams including a first beam section extending in a first direction and a second beam section extending in a second direction that is opposite to the first direction, the first beam section and the second beam section each including a lower surface that is spaced apart from, and faces in an opposing relationship, the upper surface of the base, each of the double-cantilevered beams further including two oppositely disposed free ends; and
    a plurality of load cells, each of the plurality of load cells being located near a respective one of the free ends of the double-cantilevered beams, the plurality of load cells configured to measure a force and its position.

11. The load transducer according to claim 10, wherein each of the plurality of load cells comprises a strain gage configured to measure a load component applied at a respective one of the free ends of the double-cantilevered beams.

12. The load transducer according to claim 10, wherein the of double-cantilevered beams are laterally spaced apart from one another, and wherein the first direction in which each of the first beam sections extends is substantially parallel to the second direction in which each of the second beam sections extends.

13. The load transducer according to claim 10, wherein each of the plurality of load cells is configured as a bending beam load cell.

14. The load transducer according to claim 10, wherein each of the plurality of load cells is configured as a shear-web load cell.

15. The load transducer according to claim 10, wherein the plurality of load cells comprises four load cells, each of the four load cells being located near a respective one of the free ends of the double-cantilevered beams so that it is capable of measuring a load component applied thereto.

16. The load transducer according to claim 10, wherein electronics for the plurality of load cells are mounted on the base and between opposed lateral sides of the pair of double-cantilevered beams.

17. The load transducer according to claim 10, wherein the frame is a one-piece component.

18. The load transducer according to claim 10, wherein the base has a first plurality of mounting openings, each of the first plurality of mounting openings being disposed near a respective corner of the base; and wherein the beams have a second plurality of mounting openings, each of the second plurality of mounting openings being disposed near a respective one of the free ends of the double-cantilevered beams.

19. A load transducer comprising, in combination:
a frame having a base with an upper surface and a plurality of beams extending from the base, each of the plurality of beams including a lower surface that is spaced apart from, and faces in an opposing relationship, the upper surface of the base, each of the plurality of beams further including at least one cantilevered end; and
at least three load cells, each of the at least three load cells being located near a respective one of the cantilevered ends of the beams, the at least three load cells configured to measure a force and two moments.

20. The load transducer according to claim 19, wherein the frame is compact and of one-piece construction, and wherein the plurality of beams comprises a pair of double-cantilevered beams disposed at lateral sides of the base, each of the double-cantilevered beams including a first beam section extending in a first direction and a second beam section extending in a second direction that is opposite to the first direction, and wherein the cantilevered ends of each of the plurality of beams are oppositely disposed with respect to one another.

* * * * *